United States Patent [19]

Graroff

[11] Patent Number: 4,780,441
[45] Date of Patent: Oct. 25, 1988

[54] CATALYST COMPONENT FOR ALPHA OLEFINE-POLYMERIZING CATALYSTS AND PROCEDURE FOR MANUFACTURING THE SAME

[75] Inventor: Thomas Graroff, Helsinki, Finland
[73] Assignee: Neste Oy, Finland
[21] Appl. No.: 34,169
[22] Filed: Apr. 1, 1987

[30] Foreign Application Priority Data

Apr. 1, 1986 [FI] Finland ............................ 861389

[51] Int. Cl.$^4$ .............................................. C08F 4/64
[52] U.S. Cl. ................................ 502/107; 502/119; 502/123; 502/125; 502/126; 502/127; 502/133; 502/134; 526/124; 526/125
[58] Field of Search ............... 502/107, 119, 123, 125, 502/126, 127, 133, 134

[56] References Cited

U.S. PATENT DOCUMENTS

| | | | |
|---|---|---|---|
| 3,953,414 | 4/1976 | Galli et al. | 502/134 X |
| 4,107,415 | 8/1978 | Giannini et al. | 502/125 X |
| 4,226,741 | 10/1980 | Luciani et al. | 502/127 X |
| 4,487,845 | 12/1984 | Triplett | 502/107 |
| 4,529,716 | 7/1985 | Banzi et al. | 502/134 X |
| 4,532,313 | 7/1985 | Matlack | 502/134 X |
| 4,544,717 | 10/1985 | Mayr et al. | 502/127 X |

*Primary Examiner*—Patrick P. Garvin
*Attorney, Agent, or Firm*—Steinberg & Raskin

[57] ABSTRACT

A catalyst component for alpha olefine-polymerizing catalysts which comprise an organoaluminum compound, an external electron donor, and a solid catalyst component obtained when a solid carrier component containing magnesium has reacted with a titanium halide compound, in addition to a procedure for manufacturing the same. The catalyst component is produced by reacting a solid carrier component with a titanium halide compound with or without the presence of an internal electron donor. The solid carrier component is prepared by (a) dissolving or suspending a magnesium compound in ethanol or water,
(b) adding to the solution or suspension, hydrochloric acid in a substantially stoichiometric quantity to the magnesium, to completely dissolve the same,
(c) drying the magnesium solution with the aid of periodic azeotropic distillation, and
(d) precipitating the solid carrier component from the thus-dried solution.

9 Claims, No Drawings

CATALYST COMPONENT FOR ALPHA OLEFINE-POLYMERIZING CATALYSTS AND PROCEDURE FOR MANUFACTURING THE SAME

BACKGROUND OF THE INVENTION

The invention concerns a catalyst component for an alpha olephine-polymerizing catalyst, which comprises an organoaluminum compound, an electron donor, and a solid catalyst component which is obtained when a compound containing magnesium has reacted with a titanium halide compound. The present invention is also directed to a procedure for manufacturing this catalyst component, and to a procedure for polymerizing the alpha olefines, especially propylene, which makes use of the catalyst component.

Catalysts known in the prior art with high activity for polymerizing alpha olefines, which have been manufactured include an aluminum alkyl compound, an electron donor, and a halogenated titanium compound on a carrier substance comprising various magnesium compounds. Chlorinated magnesium compounds have generally been used as the magnesium compound, which may be, for instance, water-free magnesium chloride alone or together with other magnesium compounds, or an organic magnesium compound which has been prepared by halogenating organic magnesium compounds with the aid of chlorine-containing compounds.

In polymerizing catalysts of this type, the properties of the solid carrier component have significant influence upon the properties of the ultimate catalyst, e.g. upon its activity. These properties can be substantially influenced through the mode of manufacturing of the carrier component.

The present invention concerns a catalyst component in which the carrier component has been prepared from compounds containing magnesium which may be natural minerals or synthetic minerals. Magnesium minerals have been used as starting material in preparing inert carrier components for Ziegler-Natta catalysts for the purpose of polymerizing olefines. However, it has turned out to be difficult to manufacture active Ziegler-Natta catalysts from various magnesium compounds and from minerals containing the same, in particular those catalysts for the polymerizing processes of propylene, because in these processes the catalysts are highly sensitive to moisture and to the crystallized water contained in the carrier. Even minimal quantities of crystallized water already significantly reduce the activity of the catalyst.

Moreover, these synthesis procedures which are in use have a great deal of steps and are laborious, if it is desired to use various magnesium compounds with or without craystal water as the starting material.

SUMMARY OF THE INVENTION

Accordingly, it is an object of the present invention to improve polymerizing of olefines, notably propylene.

It is also an object of the present invention to provide a new and improved catalyst component for carrying out the polymerizing of the olefines.

It is a further object to provide a method for manufacturing a catalyst component for use in the polymerizing of olefines.

These and other objects are attained by the present invention which is directed to a catalyst component for an alpha olefine-polymerizing catalyst which comprises an organoaluminum compound, an external electron donor, and a solid catalyst component obtained when a solid carrier component containing magnesium has reacted with a titanium halide compound and which is free of the drawbacks noted above and therefore suitable for use in the polymerizing of the olefines, notably propylene. In particular, the catalyst component (i.e. carrier component) for the alpha olefine polymerizing is prepared by (a) dissolving or suspending a magnesium component in water or ethanol to prepare a solution or suspension thereof, (b) adding to the thus-prepared solution or suspension hydrochloric acid in a substantially stoichiometric quantity to the magnesium, to completely dissolve the magnesium component, (c) subjecting the thus-obtained magnesium solution to azeotropic distillation to remove crystallized water therefrom, and (d) precipitating the magnesium component from the remaining solution, thereby forming the catalyst component (i.e. solid carrier component). The solid carrier component formed in step (d) is then reacted with a titanium halide, with or without the presence of an internal electron donor, to form a catalyst component which is then combined with the organoaluminum compound and an external electron donor to catalyze the olefine-polymerizing reaction.

The present invention is also directed to a method for manufacturing a catalyst component for an alpha olefine-polymerizing catalyst comprising an organoaluminum compound, an external electron donor, and a solid catalyst component containing magnesium which is obtained when a solid carrier component containing magnesium has reacted with a titanium halide compound. The method of the present invention is characterized by preparing the catalyst (i.e. solid carrier) component by (a) dissolving or suspending a magnesium component in ethanol or water to form a solution or suspension thereof, (b) adding to the solution or suspension, hydrochloric acid in a substantially stoichiometric quantity to the magnesium, to completely dissolve the magnesium component, (c) subjecting the thus-obtained magnesium solution to azeotropic distillation to remove crystallized water therefrom, and (d) precipitating the magnesium component from the remaining solution, thereby forming the catalyst (i.e. solid carrier) component. The solid carrier component formed in step (d) is then reacted with a titanium halide compound, with or without the presence of an internal electron donor, to form a catalyst component which is then combined with the organoaluminum compound and external electron donor for carrying out the alpha-olefine polymerizing. The present invention is also directed to a method for polymerizing olefins, especially propylene, in which the polymerizing is carried out in the presence of the catalyst component of the present invention.

The catalyst component of the present invention, and the solid carrier component (which is reacted with the titanium halide to form the catalyst component) of the invention provide several important advantages over carrier components containing magnesium which have been prepared by conventional synthesis techniques.

For instance in manufacturing the carrier component, it is possible to use an open reaction vessel. Moreover, because the synthesis is not sensitive to oxygen and moisture an inert nitrogen atmosphere is not absolutely essential for the synthesis. So-called wet salts and minerals may be used in the manufacturing.

DESCRIPTION OF THE PREFERRED EMBODIMENTS

It is possible in manufacturing the catalyst component of the invention to use both organic and inorganic magnesium compounds soluble in water or alcohol for starting material containing magnesium. Suitable organic magnesium compounds are, for instance, magnesium acetate, magnesium formiate, magnesium etholate, magnesium metholate and magnesium propylate. Suitable inorganic magnesium compounds, are, among others, magnesium oxide, magnesium carbonate and magnesium hydroxide. It is equally possible to use for starting material many minerals containing magensium, examples of such being $Mg_2(CO_3)(OH)_2 3H_2O$, $MgCO_3 2H_2O$, $CaMg(CO_3)_2$, $Mg_5(CO_3)_4(OH)_2 5H_2O$, $Mg(C_2O_4) 2H_2O$, $CaMg_3(CO_3)_4$, $Mg_5(CO_3)_4(OH)_2 4H_2O$, $Mg_2Cl(OH)_3 4H_2O$, $MgCO_3 5H_2O$, $MgF_2$, $MgSi(OH)_2 H_2O$ and $CaMg_2Cl_6 12H_2O$. The magnesium component is preferably selected from the group consisting of $Mg(CH_3COO)_2$, $Mg(CHOO)_2$, $Mg(O-CO-C_6H_5)$, $Mg(C_2H_5COO)_2$, the salts thereof with crystal water and mixtures thereof.

The first step in preparing the catalyst component of the invention is dissolving or suspending the magnesium compound in water or alcohol. Dissolving in alcohol is preferable because the water quantities that have to be removed are substantially less. The alcohol may be methanol, ethanol or propanol. However, ethanol is the most suitable choice. Hydrochloric acid is now added to the solution or suspension in a quantity substantially stoichiometrically equivalent to that of magnesium. The hydrochloric acid may be in gaseous or liquid form. However, concentrated aqueous solution of hydrochloric acid (38%) is the most suitable choice.

Hydrochloric acid is advantageously added in the form of a concentrated aqueous solution. On addition of the hydrochloric acid, the magnesium component is completely dissolved when the pH of the suspension has sufficiently dropped. The hydrochloric acid is added in a quantity such that pH drops to at least 3, preferably even down to 1. If too little hydrochloric acid is added, then a great part of the magnesium may remain undissolved.

In accordance with the invention, the crystal water is removed by distilling, with the aid of periodic azeotropic distillation. During the distillation, an azeotropic mixture of alcohol and water escapes from the solution, whereby the water quantity is reduced. By adding new water-free ethanol to the solution and by repeated distillation, total removal of crystal water from the magnesium component is accomplished.

The number of azeotropic distilling runs required depends on the amount of water present in the solution, and on the intended use of the catalyst. Preferably about 1–15 runs are carried out. If the catalyst is intended for use in polymerizing ethylene, fewer runs are needed, for instance about 1 to 5 runs. When manufacturing a carrier component for propylene polymerizing, a nearly water-free carrier component is required, with it having been found that this is achieved if the number of distilling runs is 8 to 15, advantageously 10 to 12. The water content of the carrier component can then be brought down to about 0.3 moles of crystal water, which may be considered the upper limit for propylene-polymerizing catalyst.

After drying out the crystal water, precipitation of the magnesium carrier component is effected by transferring the dried ethanol solution into a cold solvent, whereby the magnesium component will precipitate. Suitable solvents include common organic hydrocarbons used as solvents. Heptane is a highly appropriate solvent, since its boiling point is sufficient high so that in the titanizing step which is carried out subsequently to formation of the carrier component, titanium has time to react, while on the other hand, the boiling point is low enough to avoid melting of the carrier component in the titanizing step.

When the ethanol solution containing the magnesium component is added into cold heptane, the carrier component is precipitated in finely divided form. After washing and drying, the carrier component is titanized with the aid of titanium tetrachloride, in a manner known in and of itself in the art, for producing the catalyst component.

Titanizing may be accomplished by, for instance, mixing the solid carrier component with a titanium halide compound once or several times. Before, during, or after the titanizing process, the catalyst component may be furthermore treated with the aid of an internal electron donor compound. The titanizing is preferably accomplished in two steps, between which the internal electron donor may be added, which is usually an amine, either, or ester of this type. A suitable donor is, for instance, diisobutylphthlate, of which the quantity may be about 0.05 to 0.3, most preferably about 0.2 mol/mol Mg.

In the first step, a low temperature is recommended, e.g. below 0° C., preferably below −20 C. The second titanizing step may be carried out at a higher temperature, e.g. at about 85 to 110° C., a reaction time of about 1–1.5 hours being sufficient. The solid reaction product is then separated from the liquid phase and washed with hydrocarbon solvents to remove impurities and derivatives. The catalyst component may be dried in a light vacuum or in nitrogen gas at room temperature, or at slightly elevated temperature, and may be further homogenized by grinding in a ball mill.

The catalyst component of the invention may then be used to polymerize alpha olefins by allowing the component to come into contact with an Al compound and an external compound releasing electrons. As the external compound releasing electrons, amines, ethers, esters (preferably alkyl and arylesters of aromatic carboxylic acids) or silane compounds (alkyl/aryl silanes) may be used, examples of such being, among others, the methyl and ethyl esters of benzoic, toluic and phthalic acids, etc. The electron donors are compounds which are able to enter into complexes with Al alkyls. The stereospecificity of the catalyst can be improved with their aid.

The external compound releasing electrons or donor, and the Al alkyl are mixed together, the molar proportion of the compound releasing electrons to the Al compound being about 20 and the Al/Ti molar proportion being between 10 and 300, depending upon the polymerizing system. Polymerizing may be carried out either as a slurry or bulk polymerizing, or in the gas phase.

The catalyst component and the catalyst prepared in accordance with the present invention, may be used to polymerize alpha olefine such as ethylene, propylene, and butylene, by slurry, bulk, and gas phase methods. However, the catalyst component of the invention is especially well suited for use in polymerizing propylene, because the quantity of crystal water in the carrier substance or component is singularly low. As a result, the activity of the catalysts is especially high, particularly regarding polymerizing of propylene.

The present invention will be described in greater detail in the following examples:

EXAMPLE 1

10 g. dark brucite ($Mg(OH)_2$) was suspended in 100 ml ethanol and titrated with 20 ml conc. hydrochloric acid (38%) to pH 1. Drying of the ethanol solution was carried out by azeotropic distilallation. The drying process consumed 1900 ml absolute ethanol (moisture content <100 ppm $H_2O$) and the distillation took place in a slow nitrogen flow. When the dry (moisture content <421 μg $H_2O$/0.1 ml) hot ethanol/carrier solution was transferred with mixing, into cold (−20° C.) heptane, the carrier component crystallized. The carrier component was then kept under inert conditions ($N_2$).

The carrier component was transferred into cold titanium tetrachloride (400 ml, −20° C.). After the mixture had warmed up to room temperature, 0.2 mol/mol Mg of diisobutylphthalate was added thereto, after which the catalyst component was allowed to settle. The titanium tetrachloride solution was exchanged once for new solution with the treatment repeated. The completed catalyst component was washed with heptane and dried with nitrogen. The yield was 1.2 g, and the catalyst contained: Mg 0.7%, Ti 2.9%, and $Cl^-$ 53.0%. 53.0%.

The carrier component prepared in the described manner was applied in propylene polymerizing. A catalyst which had been prepared by mixing triethylaluminum as aluminum alkyl compound and diphenylmethoxysilane (Al donor mole proportion: 20) as Lewis compound in 50 ml hetane, and admixing to this after five minutes the carrier component prepared above so as to make the Al/Ti molar proportion 200, was added into a 2-liter polymerizing reactor. Polymerizing was carried out under the following conditions: propylene partial pressure 9.0 bar, hydrogen partial pressure 0.3 bar, temperature 70° C., and polymerizing time 3 hours.

The activity of the catalyst was found to be 1.3 kg PP per g of catalyst in 3 hours.

EXAMPLE 2

A catalyst component was prepared from light-colored brucite ($Mg(OH)_2$) as in Example 1. The yield was 1.2 g, and the catalyst contained: Mg 9.4%, Ti 3.4%, and $Cl^-$ 46.0%. In a polymerizing run, the activity was found to be 2.7 kg PP per g of catalyst in 3 hours.

EXAMPLE 3

10 g $Mg(CH_3CO_2)_2 \cdot 4H_2O$ was suspended in 300 ml ethanol. 7.7 ml conc. hydrochloric acid (38%) was added. Drying of the ethanol/carrier component solution was carried out with the aid of azeotropic distillation. The drying process consumed 800 ml absolute ethanol (moisture content less than 100 ppm $H_2O$). The distillation took place in a slight nitrogen flow. When the dry (moisture content <400 μg $H_2O$/0.1 ml) hot ethanol-carrier component solution was transferred into 500 ml of cold heptane with mixing, the carrier component crystallized. The carrier component was then processed under inert conditions ($N_2$).

The extra ethanol was washed off with two heptane washings, and the carrier component was thereafter transferred into 500 ml of cold $TiCl_4$ (−20° C.). After the mixture had warmed up to room temperature, 0.1 mol/mol Mg of diisobutylphthalate was added. The mixture was boiled for 1 hour at 110° C., after which the catalyst was allowed to settle and the titanium tetrachloride solution was exchanged for new solution with the treatment repeated. The completed catalyst component was washed with heptane and dried with nitrogen. The yield was 6.3 g and contained: Mg 3.5%, Ti 7.0%, $Cl^-$ 28.0% and Si 14.0%.

The catalyst was used to polymerize propylene as in Example 1, and its activity was 1 kg PP per g of catalyst in 3 hours.

EXAMPLE 4

10 g $Mg(OCH_2CH_3)_2$ was suspended in 300 ml ethanol, and 14.5 ml conc. hydrochloric acid (38%) was added. Drying of the ethanol/carrier solution was carried out by azeotropic distillation. The drying process consumed 1500 ml absolute ethanol (moisture content <400 μg $H_2O$/0.1 ml). The distillation took place in a slow nitrogen flow. When the dry (moisture content <400 μg $H_2O$/0.1 ml) hot ethanol/carrier solution was transferred, with mixing into cold heptane, the carrier component crystallized. The carrier component was then processed under inert conditions ($N_2$).

The carrier component was transferred into 400 ml cold titanium tetrachloride (−20° C.). After the mixture had warmed up to room temperature, 0.2 mol/mol Mg of diisobutylphthalate was added. The mixture was boiled for 1 hour at 110° C., after which the catalyst component was allowed to settle and the titanium tetrachloride solution was exchanged once for new solution with the treatment repeated. The completed catalyst component was washed with heptane and dried with nitrogen. The yield was 0.2 g and contained: Mg 8.0%, Ti 6.0%, and $Cl^-$ 57.0%.

The catalyst was used to polymerize propylene as in Example 1, and its activity was 2.2 kg PP per g of catalyst in 3 hours.

The preceding description of the present invention is merely exemplary, and is not intended to limit the scope thereof in any way.

What is claimed is:

1. Method for manufacturing a catalyst component for α- olefine polymerizing catalysts comprising an organoaluminum compound, an external electron donor, and said component, which comprises
   (a) dissolving or suspending a magnesium component, in water or alcohol to prepare a solution or suspension,
   (b) adding to the thus-prepared solution, hydrochloric acid in a quantity substantially stoichiometrically equivalent to the magnesium, to completely dissolve the magnesium component.
   (c) subjecting the thus-obtained magnesium solution to azeotropic distillation to remove crystallized water therefrom,
   (d) precipitating the magnesium component from the remaining solution, thereby forming said catalyst component, and
   (e) reacting the thus-precipitated magnesium component with a titanium halide.

2. The method of claim 1, wherein
(e) the thus-precipitated magnesium component is reacted with the titanium halide in the presence of an internal electron donor.

3. The method of claim 1, wherein the magnesium component is selected from the group consisting of $Mg(CH_3COO)_2$, $Mg(CHOO)_2$, $Mh(O-CO-G_6H_5)$, $Mg(C_2H_5COO)_2$, the salts thereof with crystal water, and mixtures thereof.

4. The method of claim 1, wherein
(a) The magnesium compound is dissolved or suspended in alcohol.

5. The method of claim 4, wherein
(a) the alcohol is ethanol.

6. The method of claim 1, wherein
(d) the magnesium component is precipitated from the thus-dried solution after the azeotropic distillation, by adding the thus-dried solution to an organic hydrocarbon soltuion.

7. The method of claim 6, wherein (d) the hydrocarbon is heptane.

8. The method of claim 1, additionally comprising
(f) separating a solid reaction product of the reaction of the thus-precipitated magnesium component with the titanium halide, washing the solid product, and then drying the same.

9. The method of claim 5, wherein
(c) from about 1 to 15 runs of the azeotropic distillation are carried out.

* * * * *